(No Model.)
J. W. HYATT.
SHAFT HANGER BOX FOR SPRING ROLLER BEARINGS.
No. 555,510. Patented Mar. 3, 1896.
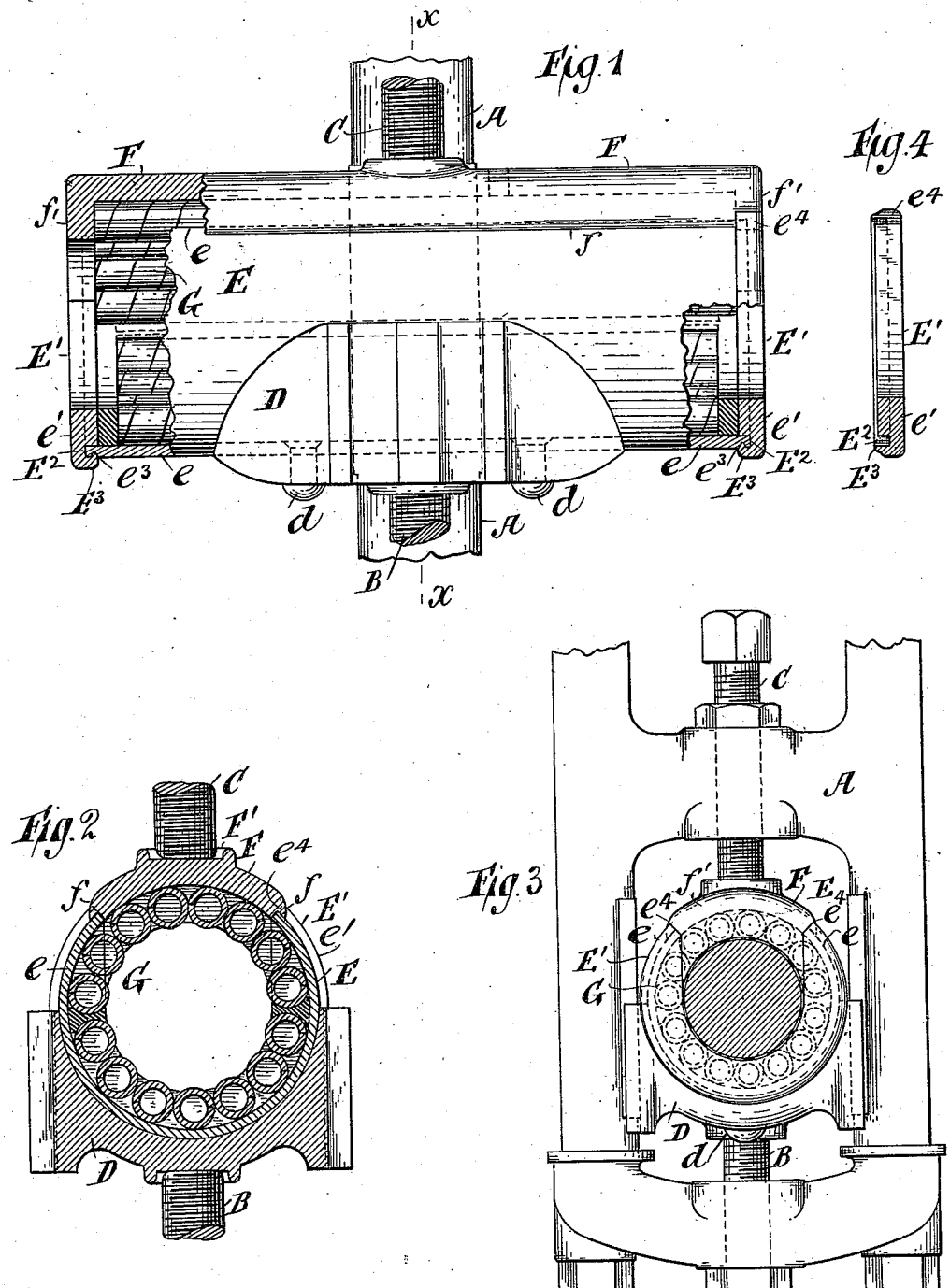
Witnesses
Geo. Wadman
E. Gatterer
Inventor
John W. Hyatt,
Per Edw. E. Lumby.
Atty.

UNITED STATES PATENT OFFICE.

JOHN W. HYATT, OF NEWARK, NEW JERSEY, ASSIGNOR TO THE HYATT ROLLER BEARING COMPANY, OF SAME PLACE.

SHAFT-HANGER BOX FOR SPRING-ROLLER BEARINGS.

SPECIFICATION forming part of Letters Patent No. 555,510, dated March 3, 1896.

Application filed September 12, 1895. Serial No. 562,228. (No model.)

*To all whom it may concern:*

Be it known that I, JOHN W. HYATT, of Newark, New Jersey, have invented an Improvement in Shaft-Hanger Boxes for Spring-Roller Bearings, of which the following is a specification.

The objects of this improvement are to lighten the construction and to promote the smoothness and noiselessness of operation of spring-roller bearings in shaft-hangers. These objects are accomplished by constructing the greater part of the box in which the spring-roller bearings are contained out of a suitably thin sheet of material, such as sheet-steel, possessing the quality of flexibility or springiness, and hence affording a less rigid support for the spring-rollers against which the shaft bears.

The accompanying drawings, illustrating a shaft-hanger bearing containing the invention, are as follows:

Figure 1 is a side elevation partly in section. Fig. 2 is a transverse section taken through the plane indicated by the dotted line $x\,x$ on Fig. 1. Fig. 3 is an end view of the bearing upon a somewhat reduced scale, showing in elevation the adjacent portions of the shaft-hanger. Fig. 4 is a section of one of the end guards, showing its shape prior to being crimped in place upon the end of the box.

The drawings represent the lower part A of a shaft-hanger of familiar construction provided with the usual vertical screw-bolts B and C for adjustably securing the journal-box at the desired elevation in the hanger. The lower vertical screw-bolt B bears at its upper end in a recess formed on the under side of the saddle D, adapted to slide vertically within the parallel legs of the hanger. The box E is composed of the trough $e$, made of any suitable flexible or springy material, such as sheet-steel, and provided with the inwardly-extending end guards $e'\,e'$ and with the cover F. The trough $e$, the bottom and sides of which are concentrically rounded, is seated in the saddle D, to which it is secured by the rivets $d\,d$. The inwardly-extending end guards $e'\,e'$, which of course might be integral with the shell of the trough $e$, are more conveniently made of the horseshoe-shaped pieces E' E' affixed to the ends of the trough $e$ in any convenient way—as, for example, in the manner illustrated in the drawings—in which, as will be seen, each of the guard-pieces E' is provided near its edge with the concentrically-curved groove $E^2$ for receiving the end of the trough $e$. The exterior of the trough $e$, near each end, is provided with the circumferential groove $e^3$, into which the exterior lip or wall $E^3$ of the groove $E^2$ is crimped or upset, as illustrated in section in Fig. 1. The longitudinal opening between the opposed edges of the trough $e$ is sufficiently wide to permit of the introduction into the box of the shaft.

The spring-rollers are distributed within the trough $e$ in an annular system G, arranged around the shaft in the usual manner. After all the rollers are inserted in their appropriate positions the cover F is applied as shown.

It will be seen that the cover F is provided along its parallel edges with the shoulders $f\,f$ fitting within the parallel edges of the trough $e$, and is provided at its ends with downward projections $f'\,f'$, which fit the opposed parallel edges $e^4\,e^4$ of the end guards $e'\,e'$, and thus serve to complete the end guards which confine the spring-rollers within the box.

The cover F is provided on the top with a central recess F' for receiving the lower end of the vertical bolt C, by means of which the box is held down to its proper position.

By this construction not only is the box considerably lessened in weight as compared with the cast-iron boxes heretofore used in shaft-hangers, but the smoothness and noiselessness of operation of the spring-roller bearing are materially promoted by the flexible or springy quality of the shell of the trough $e$.

What is claimed as the invention is—

1. The herein-described improvement in spring-roller bearings for shaft-hangers, which consists of a box for containing the annular system of spring-rollers, said box composed of a flexible or springy material, such as sheet-steel, in the form of a concentrically-rounded trough open at its ends; inwardly-extending end guards, and a removable cover; said box adapted to be seated and secured in the shaft-hanger in the usual manner.

2. In a spring-roller bearing for shaft-hangers, the open-ended trough, $e$, made of a flexible or springy material, such as sheet-steel, and having its bottom and sides concentrically rounded, horseshoe-shaped flange-pieces, $E'$ $E'$, fastened to the ends of the trough, $e$, the removable cover, F, fitting within the parallel edges of the trough, $e$, and provided at its ends with downward projections, $f'$ $f'$, fitting within the opposed parallel edges, $e^4$ $e^4$, of the end guards, $e'$ $e'$, the whole constituting the journal-box, E, the saddle, D, means for fastening the trough, $e$, thereto, and the usual vertical adjusting-bolts, B and C, for adjustably securing the journal-box in the shaft-hanger.

JOHN W. HYATT.

Witnesses:
ABRAHAM MANNERS,
DANIEL W. McGEE.